Patented Aug. 2, 1932

1,869,666

UNITED STATES PATENT OFFICE

RENÉ CHAUX AND CHARLES DUFRAISSE, OF PARIS, FRANCE, ASSIGNORS TO COMPAGNIE DE BETHUNE, OF BULLY-LES-MINES, FRANCE, A CORPORATION OF FRANCE

Δ2-CYCLOPENTEN BARBITURIC ACIDS

No Drawing. Application filed January 31, 1930, Serial No. 425,064, and in France February 5, 1929.

The object of the present invention is to obtain new di-substituted barbituric acids, containing a Δ2-cyclopenten radical and another aliphatic or cyclic radical, all of these bodies having sedative, hypnotic and also analgesic properties, of the general formula:

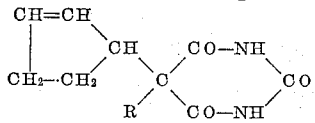

(where R represents an aliphatic or cyclic radical).

To prepare such bodies, the di-substituted malonic esters, of the general formula:

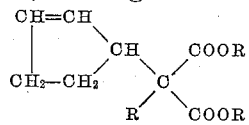

(where R is an aliphatic or cyclic radical), or their derivatives, such as for instance acid chlorides, amide, nitrile, etc. are transformed, according to known methods, to barbituric derivatives. It is also possible to first prepare the 5,Δ2-cyclopenten-barbituric acid from the Δ2-cyclopenten-malonic ester or from the correspondent derivatives (acid chloride, amide, nitrile, etc.) according to known methods, and introduce them after the second substitute.

The preparation of these new products is carried out with high efficiencies. The bodies obtained are in the form of white crystals, having the physical and chemical properties of the barbituric derivatives.

*Example 1.*—254 grams (1 mole) of ethyl-Δ2-cyclopenten-malonic ester and 80 grams (1.3 mole) of urea are heated to 110–115° C. for three–four hours in an autoclave with the solution obtained by treating 69 grams of sodium with 1500 cc. of absolute ethyl alcohol. The alcohol is then evaporated under reduced pressure; the residue consisting of the sodium salt of the 5,5-ethyl-Δ2-cyclopenten-barbituric acid is decomposed by means of diluted hydrochloric acid. The 5,5-ethyl-Δ2-cyclopenten-barbituric acid liberated will crystallize readily. After a re-crystallization in 75% ethyl alcohol the acid will be obtained in the form of white crystals melting at 161–162° C.

*Example 2.*—A solution of 234 grams (1 mole) of allyl-Δ2-cyclopenten-malonic ester and 80 grams (1.3 mole) of urea in 500 cc. of absolute ethyl alcohol is mixed with a sodium ethylate solution obtained by treating 69 grams of sodium with 800 cc. of absolute ethyl alcohol. The reaction mixture is heated at ordinary pressure so as to cause the ethyl alcohol to progressively distil, whereafter the temperature is maintained for thirty minutes, more or less, at about 115° C. The reaction is then completed; the sodium salt of the 5,5-allyl-Δ2-cyclopenten-barbituric acid thus obtained is treated with diluted hydrochloric acid, care being taken to avoid any substantial heat development; the acid liberated will precipitate as white flakes. After a re-crystallization in aqueous 75% ethyl alcohol the 5,5-allyl-Δ2-cyclopenten-barbituric acid will be obtained in the form of white crystals melting at 139°–140° C.

By a similar process as in Examples 1 and 2, n-propyl-Δ2-cyclopenten-malonic ester will produce 5,5-n-propyl-Δ2-cyclopenten-barbituric acid in the form of white crystals melting at 147°–148° C. Phenyl-Δ2-cyclopenten-malonic ester will produce 5,5-phenyl-Δ2-cyclopenten-barbituric acid in the form of white crystals melting at 183°–184° C. Bis-Δ2-cyclopenten-malonic ester will produce 5,5-bis-Δ2-cyclopenten-barbituric acid in the form of white crystals melting at 156–157° C. Isopropyl-Δ2-cyclopenten-malonic ester will produce 5,5-isopropyl-Δ2-cyclopenten-barbituric acid in the form of white crystals melting at 171–172° C. n-butyl-Δ2-cyclopenten-malonic ester will produce 5,5-n-butyl-Δ2-cyclopenten-barbituric acid as white crystals melting at 145–146° C.

*Example 3.*—226 grams (1 mole) of Δ2-cyclopenten-malonic ester and 80 grams (1.3 mole) of urea are introduced into a solution of 69 grams of sodium in 1500 cc. of absolute ethyl alcohol. The mixture is then heated by reflux during five hours. After cooling, the mass obtained is drained by the sodium salt of the 5-Δ2-cyclopenten-barbituric acid. Upon washing this salt with absolute ethyl alcohol, 216 grams (1 mole) of this salt are dissolved in 2500 cc. of water. The said solution is then mechanically stirred with 240 grams (1.2 moles) of β-bromallyl bromide for twenty hours at a temperature of 15 to 20° C. At the end of this period of time only 40 to 50 grams of β-bromallyl bromide will remain unaffected and can be recovered by decantation. Acidifying the aqueous solution with diluted hydrochloric acid will cause 5,5-β-bromaliyl-Δ2-cyclopenten-barbituric acid to settle in the form of a more or less resinous magma which, upon being ground with chloroform, will crystallize completely.

After a re-crystallization in 75% aqueous ethyl alcohol, white crystals will be obtained which will melt at 192–193° C. (instantaneous fusion).

We claim as our invention:—

1. The new barbituric acids herein described, of the general formula:

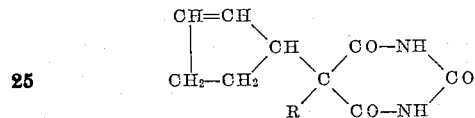

where R is an aliphatic, phenyl, or Δ2-cyclopenten radical, these products being crystallized bodies with sedative, hypnotic and analgesic properties.

2. The new barbituric acid herein described: 5,5-Δ2-cyclopenten-allyl-barbituric acid, of the formula:

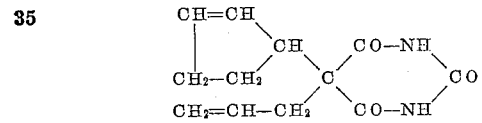

this product being white crystals (of 75% aqueous ethyl alcohol) melting at 139–140° C. and having sedative, hypnotic and analgesic properties.

In testimony whereof, we affix our signatures.

RENÉ CHAUX.
CHARLES DUFRAISSE.